United States Patent [19]
Wells et al.

[11] Patent Number: 5,709,243
[45] Date of Patent: Jan. 20, 1998

[54] LOW SPILL FEMALE COUPLING

[75] Inventors: Michael P. Wells, Holland; Todd J. Vogel, Waterville; David S. Densel, Whitehouse, all of Ohio

[73] Assignee: Aeroquip Corporation, Maumee, Ohio

[21] Appl. No.: 759,998

[22] Filed: Dec. 3, 1996

Related U.S. Application Data

[63] Continuation-in-part of Ser. No. 559,623, Nov. 20, 1995, abandoned.

[51] Int. Cl.⁶ ........................................ F16L 37/28
[52] U.S. Cl. ............................ 137/614.03; 137/614.01
[58] Field of Search ...................... 137/614.01, 614.03, 137/614.04

[56] References Cited

U.S. PATENT DOCUMENTS

| | | | |
|---|---|---|---|
| 2,319,015 | 5/1943 | Speth | 137/614.03 |
| 2,966,371 | 12/1960 | Bruning | 137/614.04 |
| 4,098,292 | 7/1978 | Evans | 137/614.04 |
| 4,543,993 | 10/1985 | Calvin et al. | 137/614.01 |
| 4,614,348 | 9/1986 | Fournier | 271/188 |
| 4,892,117 | 1/1990 | Spalink et al. | 137/614 |
| 5,123,446 | 6/1992 | Haunhorst et al. | 137/614 |
| 5,129,423 | 7/1992 | Fournier et al. | 137/614 |
| 5,179,976 | 1/1993 | Boland et al. | 137/614 |
| 5,215,122 | 6/1993 | Rogers et al. | 285/308 |
| 5,226,682 | 7/1993 | Marrison et al. | 285/308 |
| 5,452,736 | 9/1995 | Arosio | 137/614.03 |

FOREIGN PATENT DOCUMENTS 3406211  8/1985  Germany.

OTHER PUBLICATIONS

Hydraulic Fluid Power—Quick-Action Couplings, International Standard, published Apr. 1, 1987.
Quick Disconnect Couplings, Aeroquip Bulletin JB27, published 1992.

*Primary Examiner*—A. Michael Chambers
*Attorney, Agent, or Firm*—Emch, Schaffer, Schaub & Porcello, Co., L.P.A.

[57] ABSTRACT

A female coupling member includes a body portion, a slideable sleeve positioned in the body portion and an axially extending stem valve sealingly engageable with the sleeve. Axial movement of the sleeve relative to the stem valve opens the female coupling member to the flow of fluid. The stem valve is provided with a cavity sized to receive a protruding nose of a male member to be attached thereto. The slideable sleeve and the stem valve are designed to receive the male coupling member including its flat insertion end and protruding nose with minimal air inclusion and minimal fluid loss upon disengagement.

32 Claims, 10 Drawing Sheets

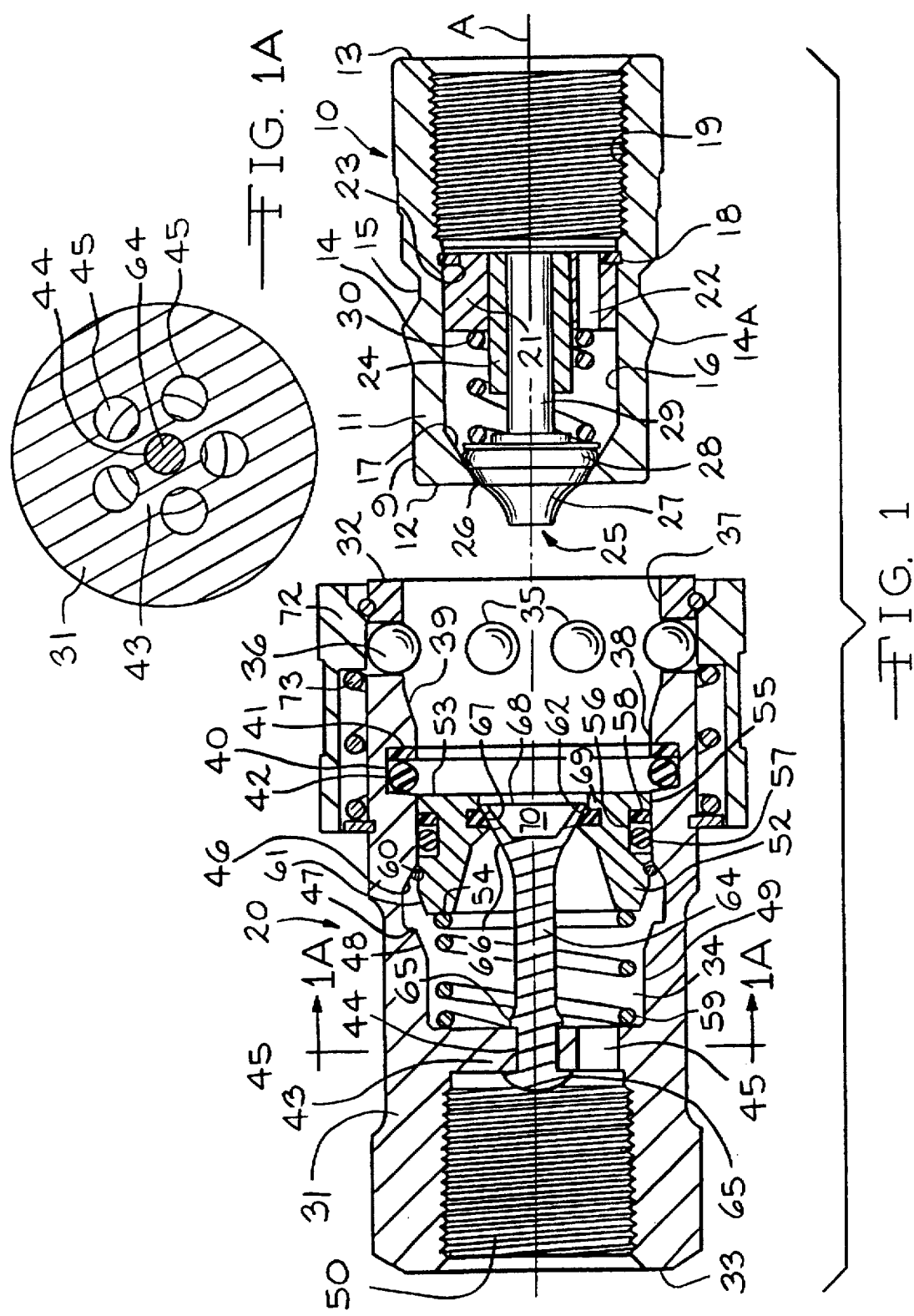

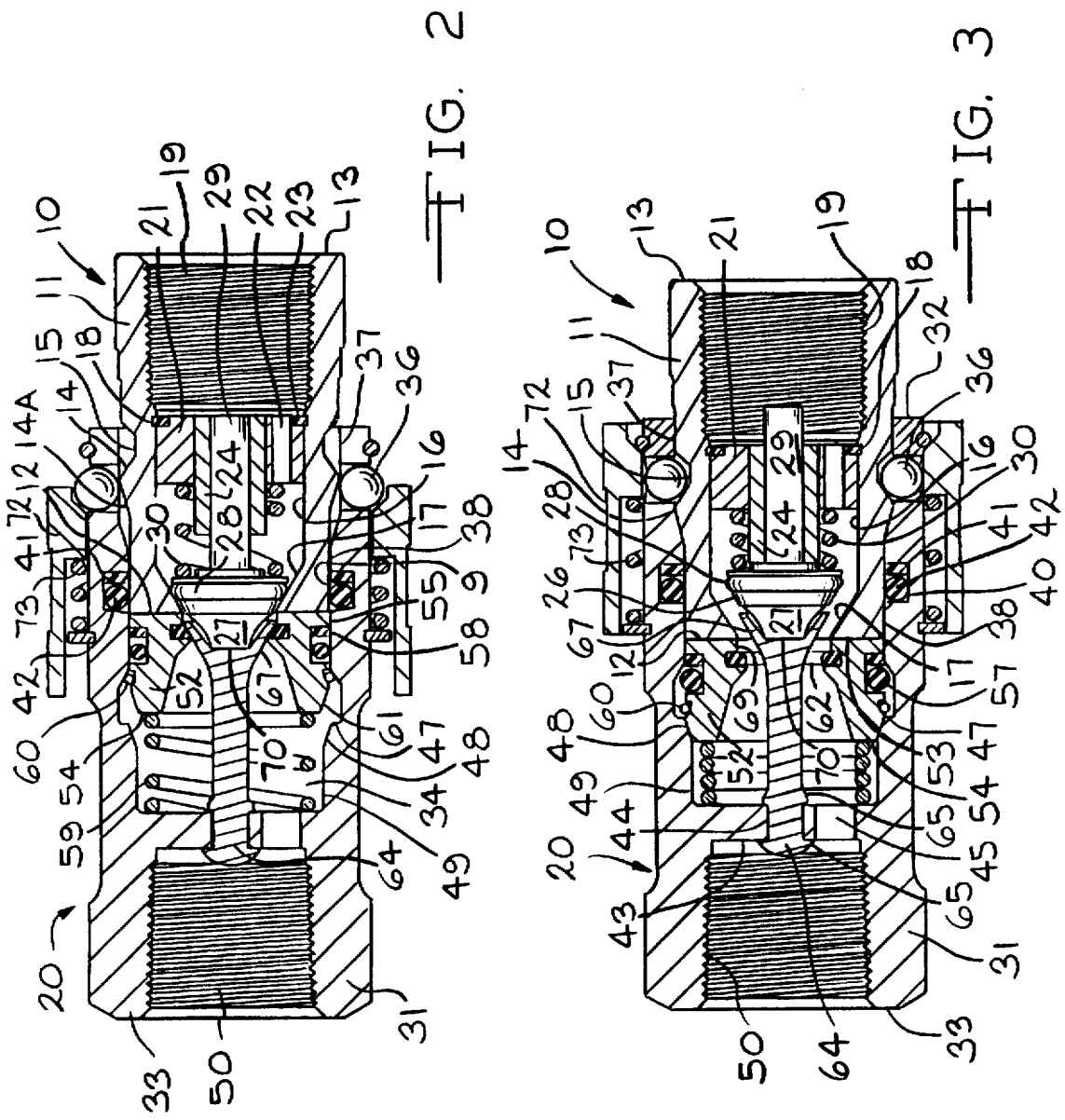

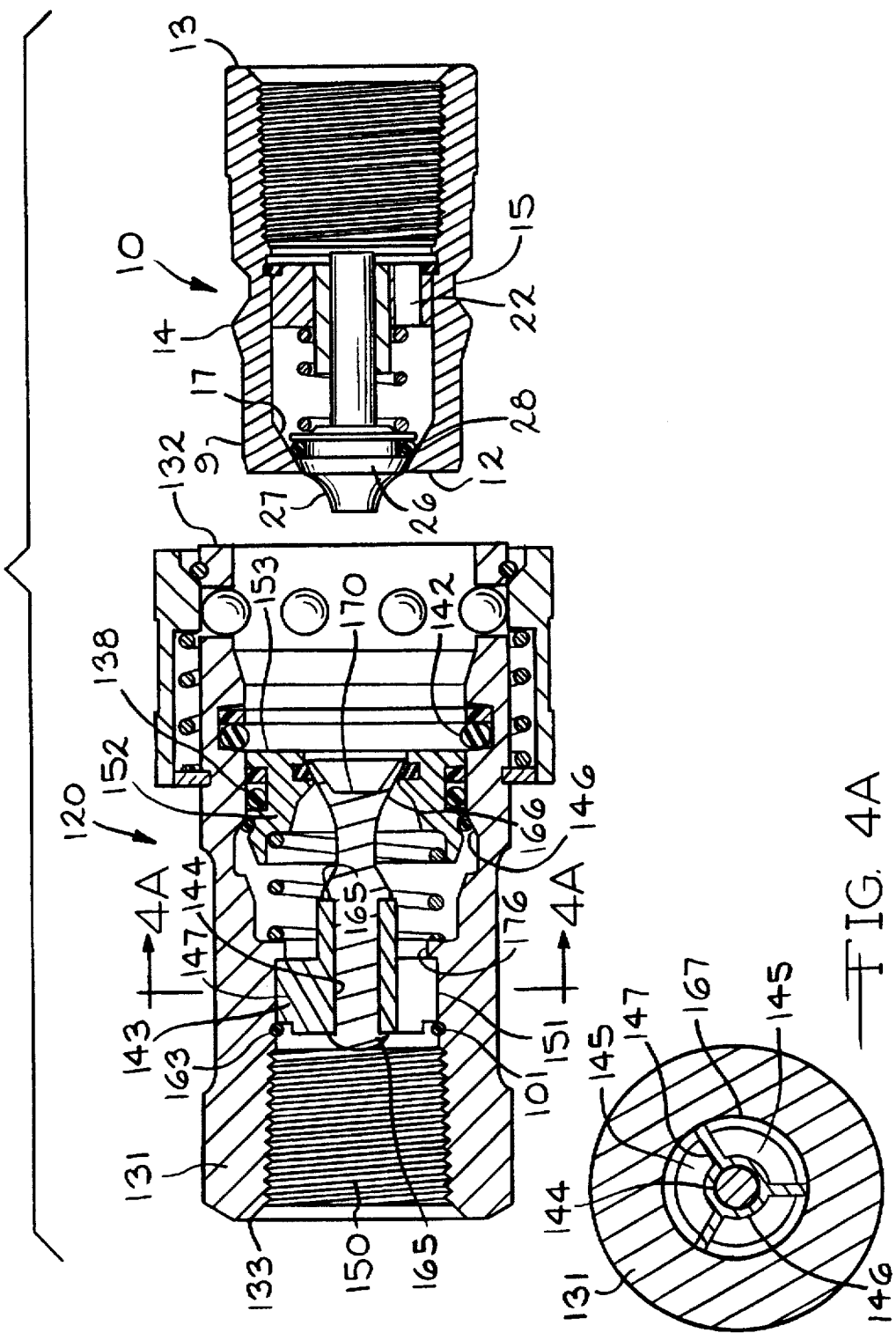

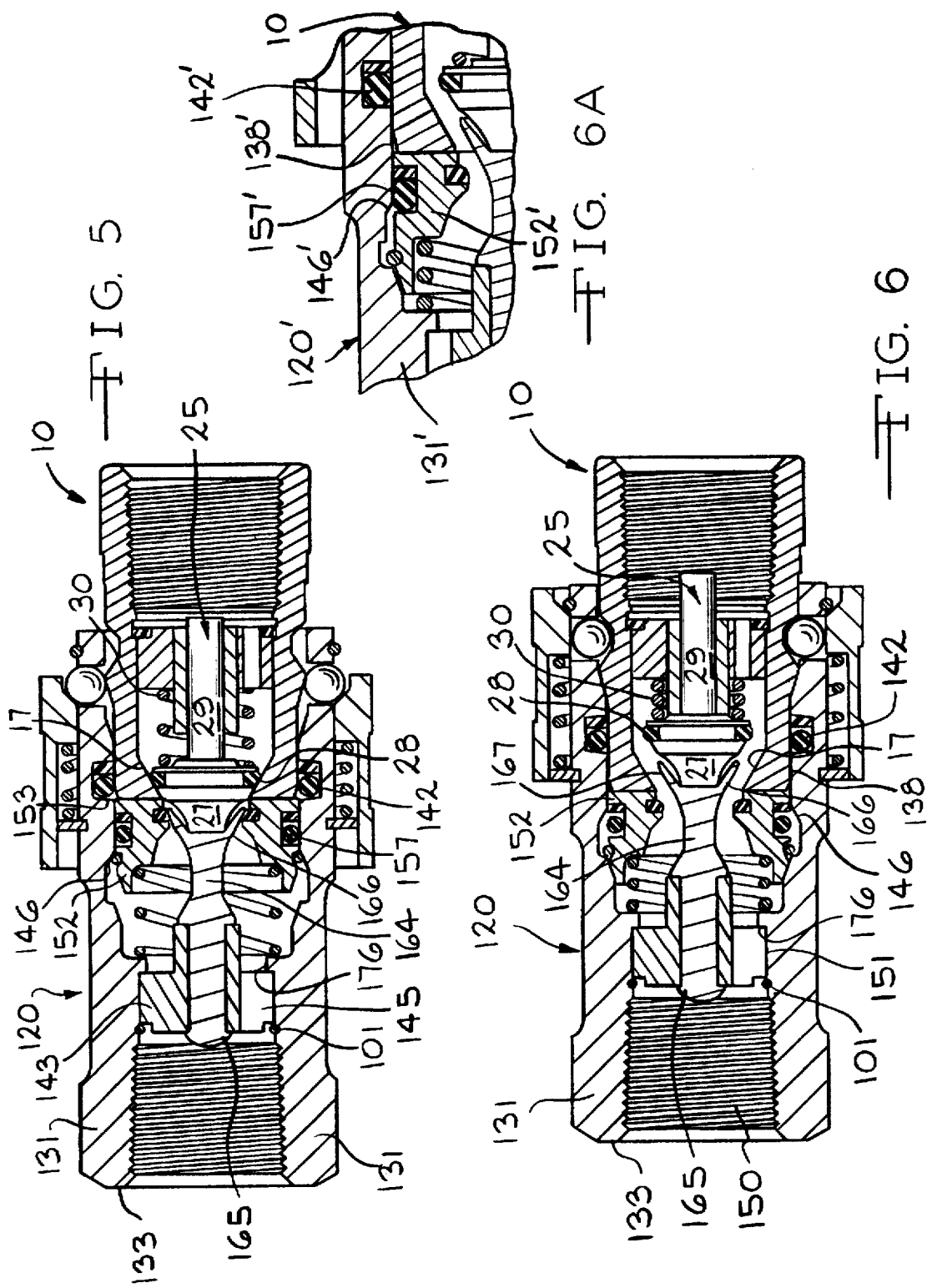

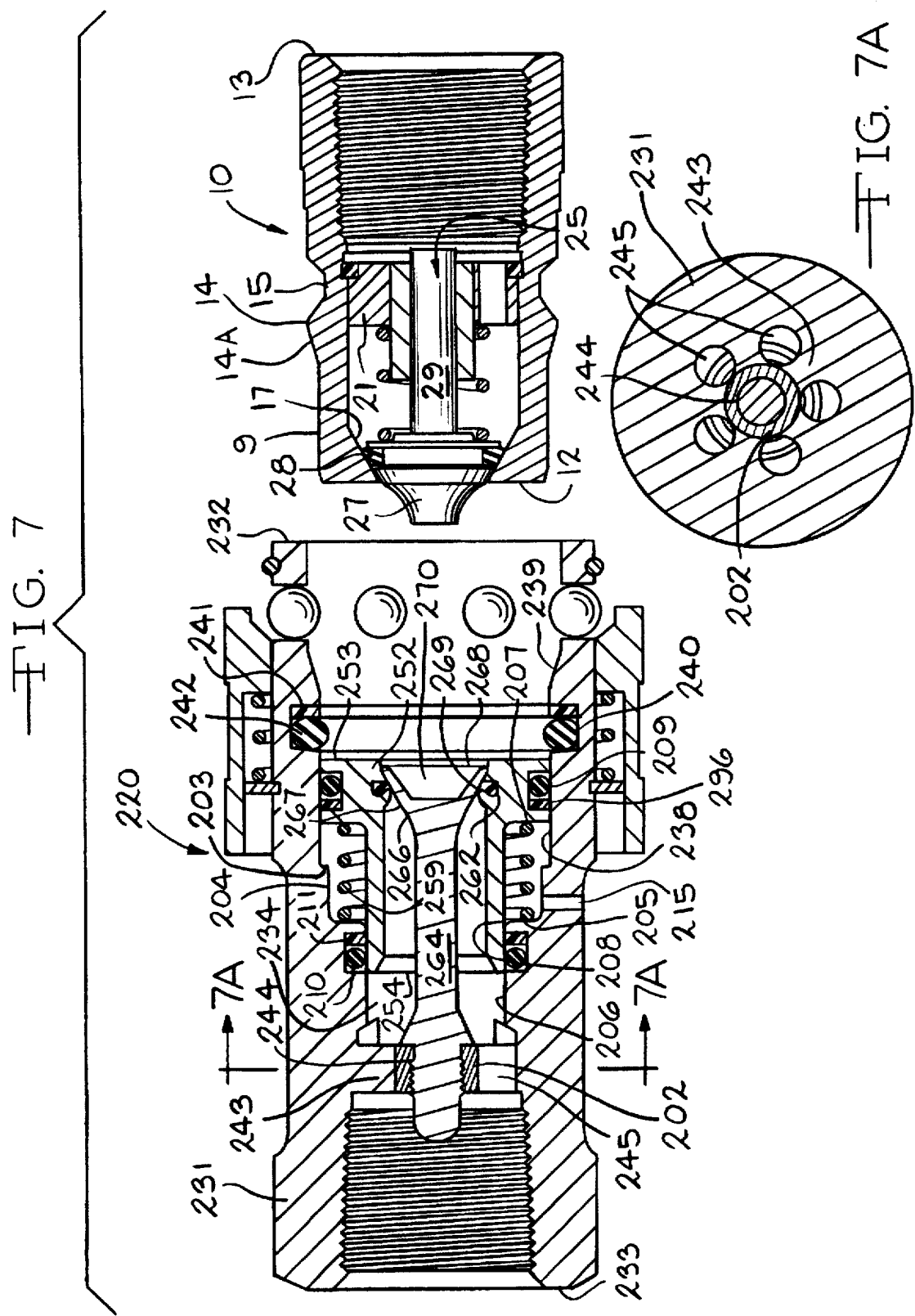

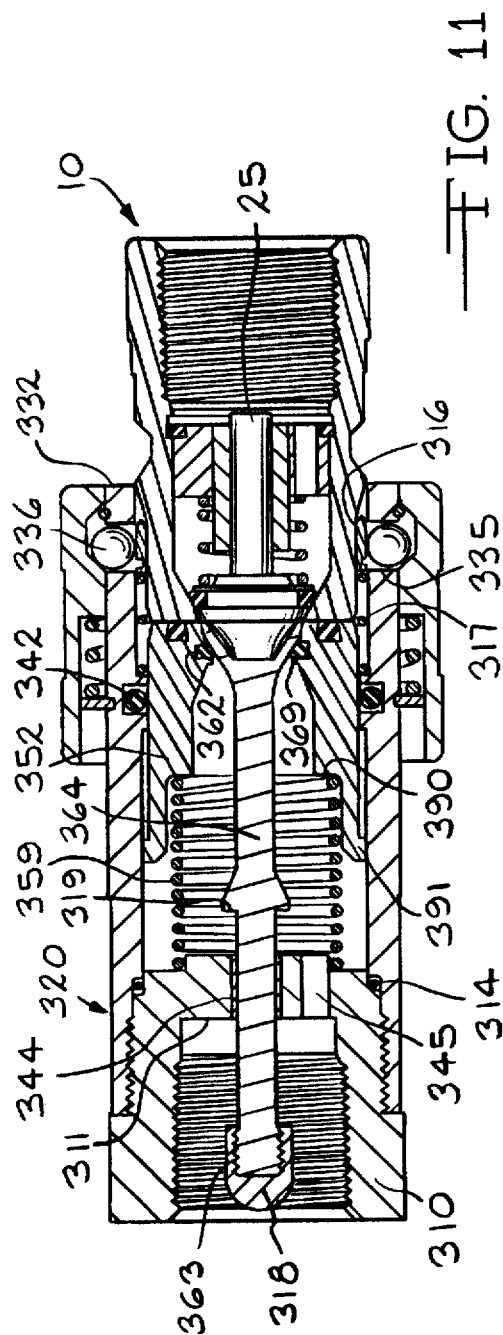
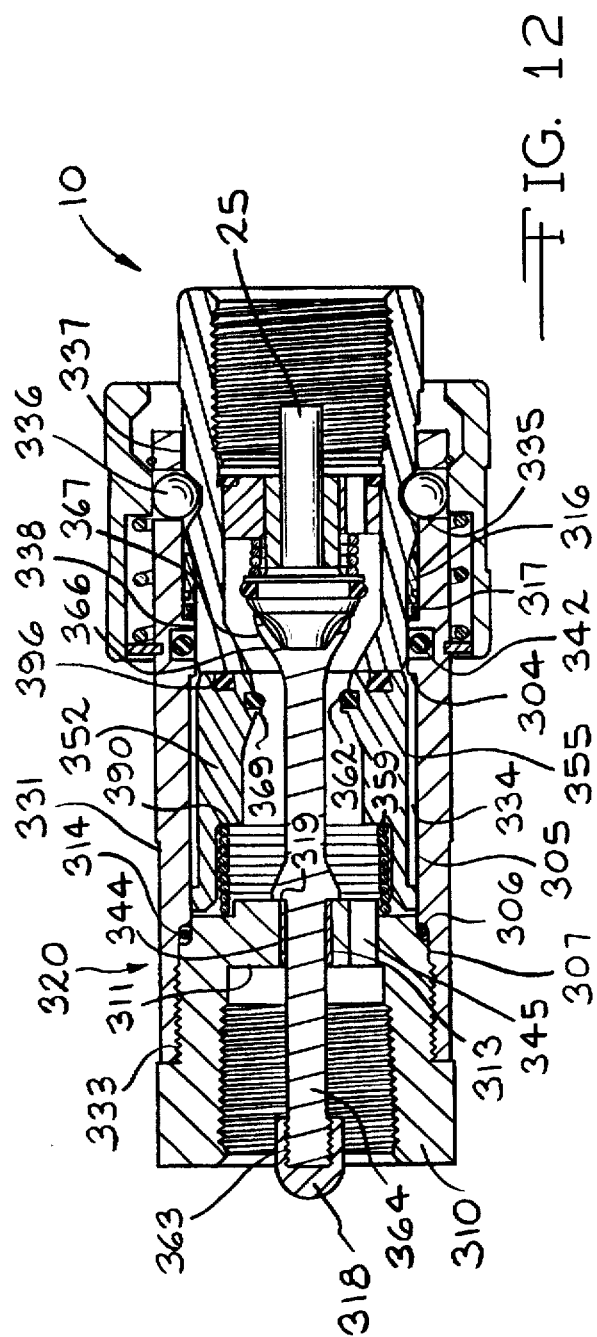
FIG. 11
FIG. 12

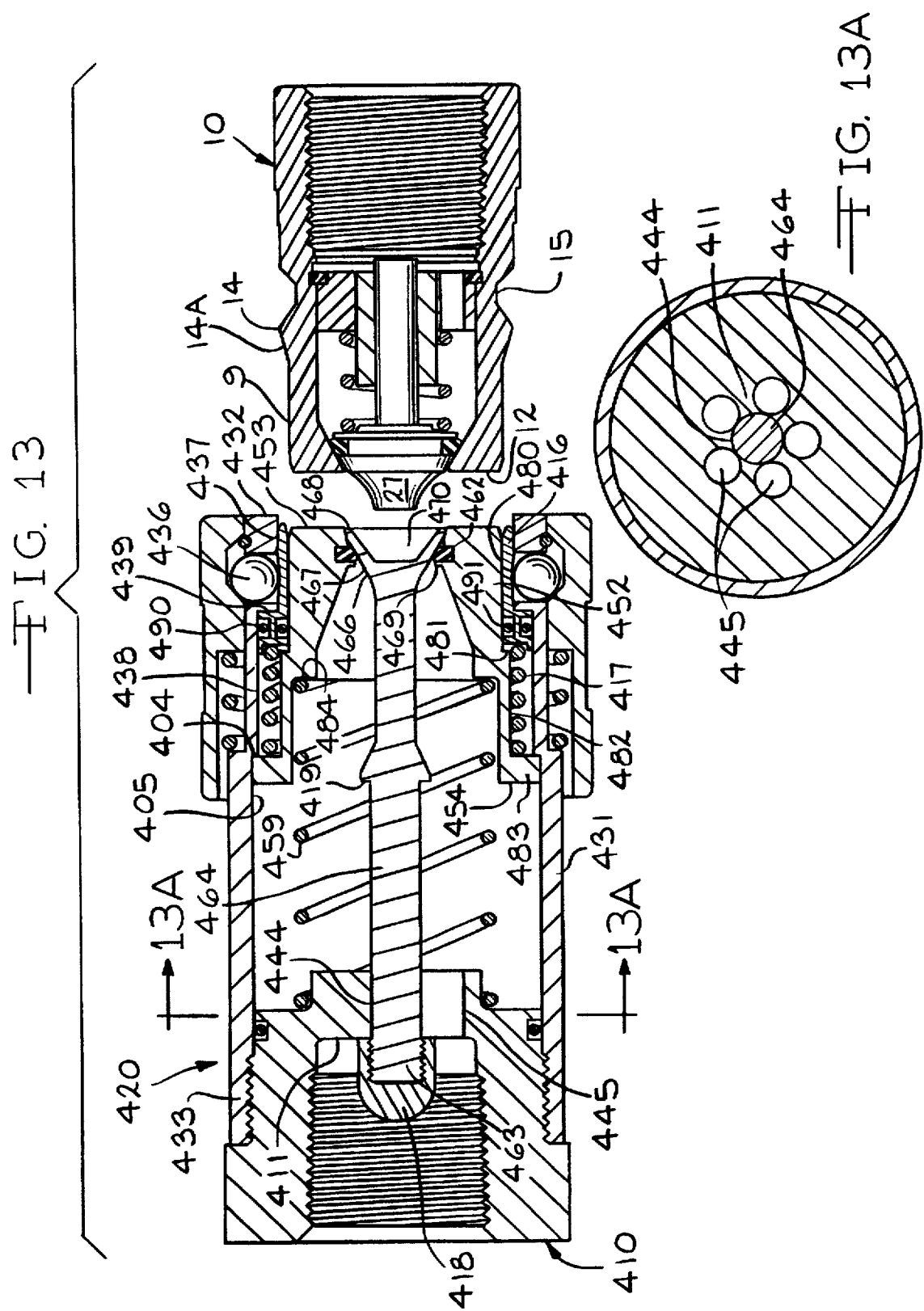

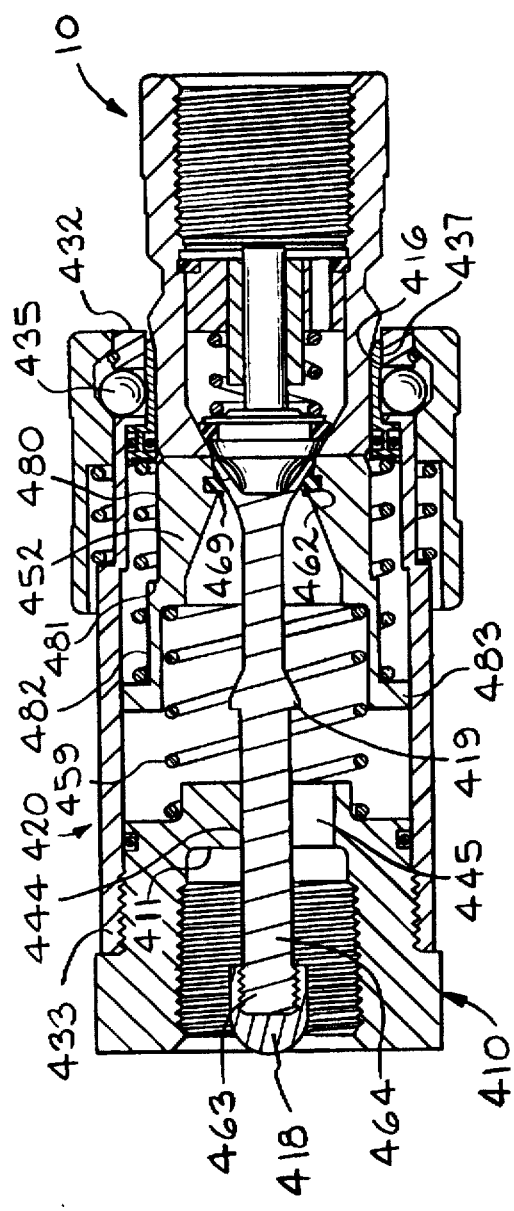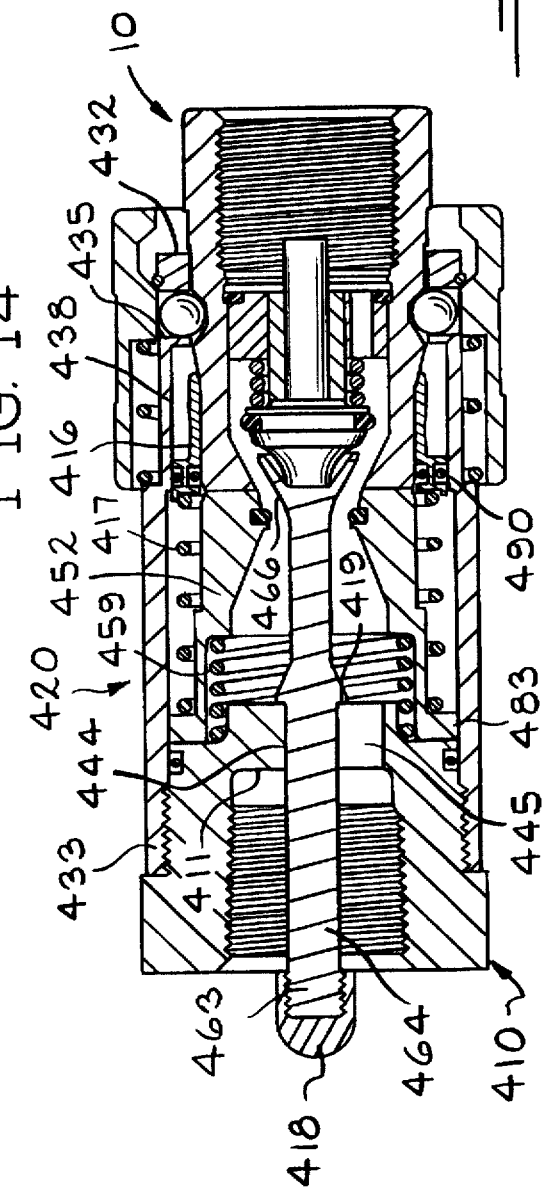

LOW SPILL FEMALE COUPLING

CROSS REFERENCE TO RELATED APPLICATION

This is a continuation-in-part of application Ser. No. 08/559,623, filed Nov. 20, 1995, now abandoned.

BACKGROUND OF THE INVENTION

For many applications it is desirable to utilize quick disconnect couplings consisting of a male coupling member attached to one end of a fluid conduit line and a female coupling member attached to an end of an opposing fluid conduit line such that the opposing male and female couplings may be readily joined together with a simple axial movement of the male coupling into the female coupling. Typically the female coupling member has an axially slideably release collar which controls radial movement of detent balls from a radially outward position when the collar is retracted to a radially inward position when the collar is urged to its forward position. When the detent balls are in their radially outward position, the male member is free to be readily inserted into or removed from the female coupling and, when the detent balls are in their radially inward position, they will engage and retain a male member positioned in the female coupling. Examples of a prior art fluid couplings utilizing detent balls in cooperation with an axially slideable collar to retain a male coupling member affixed to a female coupling member may be had by reference to U.S. Pat. Nos. 4,892,117 and 5,179,976, assigned to the assignee of the present application and incorporated herein by reference. Reference is also made to International Standard ISO 7241-1 entitled "Hydraulic fluid power-quick acting couplings Q" issued by the International Organization for Standardization, First Edition 1987-04-01, Part 1 which sets forth dimensions and requirements for such quick-acting couplings.

For many industrial fluid flow applications, it is desirable that there be a minimal amount of fluid loss and a minimal amount of air inclusion occurring when the male coupling is joined to the female coupling or when it is removed therefrom. One type of prior art coupling having the push-to-connect feature with detent balls and an axially moveable collar controlling the detent balls which provides minimal fluid loss when the male and female coupling members are connected and disconnected is one sold by the assignee of the present invention as its FD 49 series flush face hydraulic tools coupling. Details of this coupling maybe seen in Aeroquip Corporation Bulletin JB 27 and in U.S. Pat. No. 4,614,348. Although the Aeroquip FD 49 coupling is a superior coupling and well suited for providing minimal fluid loss and minimal air inclusion upon connecting and disconnecting of the members, it requires that both the male coupling part and the female coupling part have a flat face. There are many couplings presently in commercial use which do not provide for minimal fluid loss and minimal air inclusion which are being used in applications for which it is now desired to have minimal fluid loss and minimal air inclusion. Among such a prior art types of couplings which are not presently suited for minimal fluid loss or minimal air inclusion are ones having a central nose extending beyond the body portion of the male coupling member such as that shown in the aforementioned International Standard ISO 7241-1 or as shown in the aforementioned Aeroquip Corporation Bulletin JB 27 as the male half of FD 45 series or FD 48 series couplings.

It will be appreciated that any conversion which requires converting both the female coupling members and male coupling members will involve substantial expense.

SUMMARY OF THE INVENTION

Under the present invention there is provided a female coupling member which is designed to be utilized with male coupling members having non-flat faces of the type with a projecting nose and to thereby provide a male member and female member connected coupling with minimal fluid loss and minimal air inclusion.

Accordingly, it is an object of the present invention to provide a female coupling member suitable for use with existing male, projecting nose type coupling members to convert the interconnected male/female coupling combination from a fluid-loss, air inclusion type coupling to one having minimal fluid loss and minimal air inclusion.

The female member of the present invention includes a body portion in which is positioned an axially slideable sleeve and a central stem valve having an enlarged head with a contoured receiving end extending outwardly from the receiving end of the sleeve and sized to receive the nose of an associated male coupling member. The body has an inwardly facing annular seal. The body, the sleeve and the valve stem are so configured in relationship to the male coupling member as to prevent excessive amounts of air from becoming entrapped between the male coupling member and female coupling member and to (1) prevent excessive fluid loss as such members are joined together or are disconnected and (2) to prevent the flow of fluid prior to a seal being effected between such members. The female coupling member includes in alternative embodiments, an axially slideable central stem valve which cooperates with the axially slideable sleeve to close and open the female coupling member.

IN THE DRAWINGS

FIG. 1 is an elevational view in section showing the female coupling member of the present invention disconnected from a male coupling member of a type widely in commercial use.

FIG. 1A is a sectional view taken along line 1A—1A of FIG. 1.

FIG. 2 is a view similar to FIG. 1 is showing the male coupling member positioned partially in, but not yet fully connected to, the female coupling member and with both the male coupling member and the female coupling member in the closed position.

FIG. 3 is a view similar to FIGS. 1 and 2 showing the male coupling member fully engaged to the female coupling member with each of such members and the resulting interconnected coupling being in the open position.

FIG. 4 is an elevational view in section showing a modified embodiment of female coupling member disconnected from a male coupling member.

FIG. 4A is a sectional view taken along line 4A—4A of FIG. 4.

FIG. 5 is a view of the modified embodiment of FIG. 4 with the members positioned as in FIG. 2.

FIG. 6 is a view of the embodiment of FIG. 4 with the members fully engaged as in FIG. 3.

FIG. 6A is a fragmentary sectional view showing another embodiment with the members fully engaged as in FIG. 6.

FIG. 7 is an elevational view in section showing yet another embodiment of female coupling member disconnected from a male coupling member.

FIG. 7A is a sectional view taken along line 7A—7A of FIG. 7.

FIG. 10A is a sectional view taken along line 10A—10A of FIG. 10.

FIG. 11 is a view of the embodiment of the FIG. 10 with the parts positioned as in FIG. 2.

FIG. 12 is a view of the embodiment of FIG. 10 with the parts fully engaged as in FIG. 3.

FIG. 13 is an elevational view in section showing still another embodiment of female coupling member disconnected from a male coupling member.

FIG. 13A is a sectional view taken along line 13A—13A of FIG. 13.

FIG. 14 is a view of the embodiment of FIG. 13 with the parts positioned as in FIG. 2.

FIG. 15 is a view of the embodiment of the FIG. 13 with the parts fully engaged as in FIG. 3.

DETAILED DESCRIPTION OF THE INVENTION

Figures 8, 9:
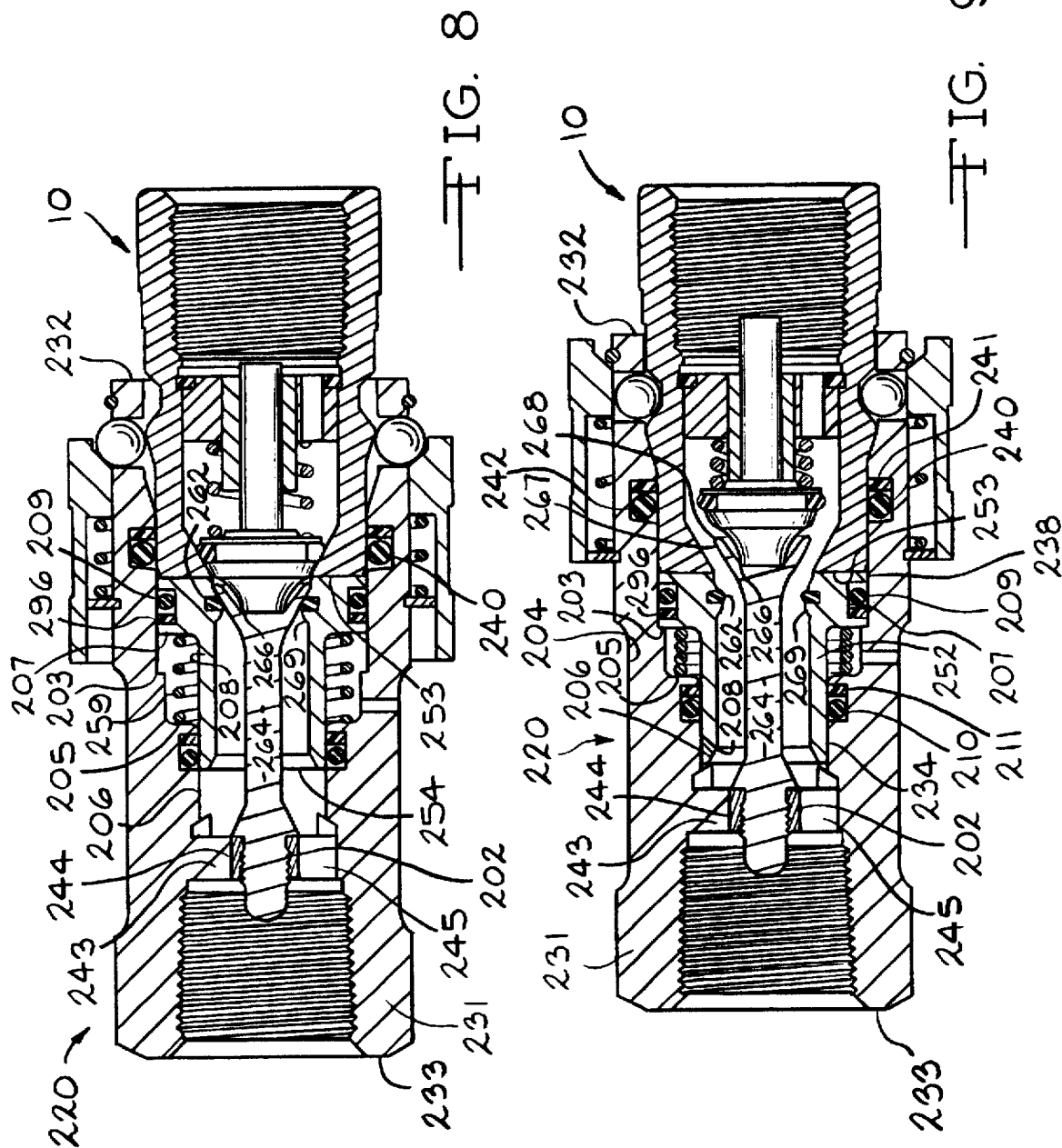
FIG. 8 is a view of the embodiment of FIG. 7 with the parts positioned as in FIG. 2.
FIG. 9 is a view of the embodiment of FIG. 7 with the parts fully engaged as in FIG. 3.

Referring now to FIG. 1 through 3 there is shown a male coupling member generally designated by the numeral 10 having a body portion 11 extending along an axis A from a insertion end 12 having a flat face to an external end 13. The exterior surface of the body portion is provided with a cylindrical wall surface 9 extending from the insertion end 12 to an outwardly tapering leading ramp 14A extending to an abutment 14. An outwardly facing annular groove 15 is positioned on the opposite side of the abutment 14. Internally, the body portion 11 has a central cylindrical wall portion 16 and an inwardly tapering wall portion 17 extending from the cylindrical wall portion 16 to the flat insertion end 12. Adjacent the cylindrical wall portion 16 is an inwardly facing groove 18. If desired, inwardly facing threads 19 for fastening to a fluid flow line may extend from the external end 13 to a position close to the inwardly facing groove 18. Other well known connector means may be utilized for fastening the male coupling member 10 to a fluid flow line.

Positioned in the body portion 11 is a spider 21 having a plurality of longitudinally extending passageways 22. A snap ring 23 is positioned in the inwardly facing groove 18 and abuts the spider 21 to prevent movement of the spider toward the external end 13. Positioned in the spider 21 is a guide sleeve 24 having a central passageway. A stem valve 25 has an enlarged head 26 with a protruding nose portion 27 which extends axially outwardly from the insertion end 12 and an axial stem 29 extending from the head 26 through the passageway of the guide sleeve 24. The enlarged head 26 is provided with an annuler seal 28 sized to sealingly engage the tapered wall portion 17. The axial stem 29 is slideable relative to the guide sleeve 24. A compression spring 30 encircles the guide sleeve 24 and axial stem 29 and has one end engaged to the spider 21 and the opposing end engaged to the enlarged head 26 to yieldingly urge the stem valve 25 to a position such that the annular seal 28 sealingly engages the tapered wall 17. The enlarged head 26 is tapered in the area between the nose portion 27 and the annular seal 28 at an angle relative to the axis A which is similar to the angle of the tapering wall portion 17 and, by virtue of its size, may engage such tapering wall portion 17 following sealing engagement of the annular seal 28 therewith to prevent the enlarged head portion adjacent the annular seal from being pushed out of body portion 11 by the compression spring 30.

The female coupling member 20 includes a body 31 extending along an axis A from a receiving end 32 to an opposing end 33. The body 31 has an axial passageway 34 extending from the receiving end 32 to the opposing end 33. A plurality of apertures 35, preferably circular in cross-section, are positioned circumferentially around the body in a position slightly spaced from the receiving end 32. The apertures 35 are sized to receive therein a plurality of detent balls 36. The body 31 includes a first inwardly facing cylindrical wall portion 37 extending from the receiving end 32 having a diametrical size sufficient to receive the abutment 14 of the male coupling member 10 and a second inwardly facing cylindrical wall portion 38 of a smaller size to receive the cylindrical wall surface 9 between the insertion end 12 and the leading ramp 14A of the abutment 14. As is well known in the art, the apertures 35 are smaller at the interior surface defined by the first inwardly facing wall portion 37 than the diameter of the balls 36 and larger than the diameter of the balls 36 at the exterior surface.

An inwardly tapering wall portion 39 joins the first inwardly facing cylindrical wall portion 37 and a second inwardly facing cylindrical wall portion 38 of smaller diameter. The angle of taper of the tapering wall portion 39 is preferably substantially the same as the angle of taper of the ramp 14A of the male coupling member 10 so that when the male coupling member 10 is fully engaged to the female coupling member 20 (see FIG. 3), the ramp 14A will be in contact with the tapering wall portion 39 throughout.

The second inwardly facing cylindrical wall portion 38 has an inwardly facing annular groove 40 in which is positioned a flat, substantially rigid Teflon or other suitable plastic ring 41 having an opening sized to closely receive the male coupling member cylindrical wall surface 9. Also positioned in the groove 40 is an annular resilient sealing ring 42 having a size to sealingly engage such cylindrical wall surface 9 of the male member 10 adjacent the insertion end 12. As can be seen in FIG. 2, the groove 40 is axially positioned such that the sealing ring 42 is engaged by and seals such cylindrical wall surface 9 simultaneously with or prior to opening the passageways to the flow of fluid.

Formed as an integral part of the body 31 is an apertured web 43 having a centrally positioned aperture 44 lying on the axis A and a plurality of five flow passages 45 positioned around the central aperture 44 (See FIG. 1A).

The portion of the body 31 between the second inwardly facing cylindrical wall portion 38 and the apertured web 43 includes an outwardly tapering wall portion 46, a shoulder 47, an inwardly tapering wall portion 48 and a third inwardly facing cylindrical wall portion 49 extending to the apertured web 43. An inwardly facing threaded section 50 or other suitable attachment means for attaching to a fluid flow line is positioned between the apertured web 43 and the opposing end 33.

An axially moveable sleeve 52 is positioned in the passageway 34. The sleeve 52 has a substantially flat abutment end 53 sized to receive the insertion end 12 of the male coupling member 10 in surface-to-surface contact and an opposing spring engaging end 54. The sleeve 52 has an outwardly facing cylindrical wall portion 55 sized for sliding engagement with the second cylindrical wall portion 38 of the body 31. The cylindrical wall portion 55 has an outwardly facing annular groove 56 in which is positioned a resilient annular seal 57 which sealingly engages the second cylindrical wall portion 38 when the sleeve 52 is in the positioned shown in FIGS. 1 and 2 and a Teflon backup ring 58 which serves to prevent blow-out of the annular seal 57 when subjected to high pressures. The sleeve 52 has a second outwardly facing annular groove positioned between the annular groove 56 and the spring engaging end 54 in which is positioned a metal retaining ring 60. The sleeve 52 is also provided with an outwardly facing inwardly tapering wall portion 61 between the groove for retaining ring 60 and the spring engaging end 54. The sleeve 52 has an inwardly facing groove in which is positioned an annular sealing ring 62. Adjacent the inwardly facing groove receiving the annular sealing ring 62 is a shoulder 69. The metal on one or both sides of the groove is crimped following positioning of the annular sealing ring 62 therein in order to retain such annular sealing ring 62.

A compression spring 59 is positioned between the web 43 and end 54 of the sleeve 52 and functions to urge the sleeve 52 toward the receiving end 32 of the body 31.

An axially extending stem valve 64 is mounted in the apertured web 43. The stem valve 64 has a portion extending through the central aperture 44 and enlarged shoulders 65 on opposite sides of the apertured web 43 holding the stem valve 64 in position in the body 31. The shoulders 65 are spaced apart a distance slightly greater than the thickness of the apertured web 43, approximately 0.010 to 0.080 inch. This permits the stem valve to float axially in order to compensate for the stack up of tolerances in the various components between the web 43 and the sleeve 52 in order to assure a seal between the sealing ring 62 and the outwardly facing wall 67 of the stem valve 64. The stack up of tolerances may include the length of the stem valve 64, the angle of the outwardly facing wall 67, the length of the sleeve 52, the positioning and angle of taper of the outwardly tapering wall portion 46 and the location of the groove in which the retaining ring 60 is positioned. The opposing end of the stem valve 64 has an enlarged head 66 having an outwardly flaring wall with an outwardly facing surface 67 adjacent the end 68 sized to sealingly engage the annular sealing ring 62 of the sleeve 52. The size of the enlarged head 66 in the area adjacent the end 68 is greater than the size of the opening of the sleeve 52 at the shoulder 69 adjacent the annular sealing ring 62 and, therefore, provides a means for limiting axial movement of the sleeve 52 toward the receiving end 32 in response to urging of the spring 59; however, the primary means of limiting such axially forward movement of the sleeve 52 toward the receiving end 32 resides in the engagement of the retaining ring 60 against the tapering wall portion 46. Thus, the relative dimensions of (1) the stem valve 64 and its enlarged head 66 with respect to the sleeve 52 and its associated groove containing the retaining ring 60 and (2) the body 31 and its tapering wall 46 are such that the outwardly facing wall 67 of the enlarged head 66 will engage the annular sealing ring 62 with sufficient force, something on the order about 10 pounds, to obtain a fluid tight seal. When the sleeve 52 is axially positioned such that the annular sealing ring 62 has sealingly engaged the outwardly facing wall 67, the retaining ring 60 will engage the tapering wall portion 46 of the body 31 to actually prevent further movement of the sleeve 52 toward the receiving end 32 in response to urging of the spring 59 and internal pressure. Thus, the retaining ring 60 serves to prevent excessive forces from being developed between the shoulder 69 and the enlarged head 66 of the stem valve 64. The parts are contoured such that the outwardly facing wall 67 will engage the shoulder 69 thereby preventing blow-out of the annular sealing ring 62 when subjected to high pressure.

The axial extent of movement of the sleeve 52 away from the receiving end 32 against the yielding action of the spring 59 is limited by engagement of the sleeve inwardly tapering wall portion 61 against the body inwardly tapering wall portion 48. Such engagement eliminates any possibility of the sleeve 52 being moved toward the opposing end 33 so far that the spring 59 bottoms out as such bottoming-out of a spring places undue fatigue on it and could result in premature failure.

The enlarged head 66 has a cavity 70 formed therein adjacent the end 68 having a size and shape to receive the nose 27 of the male coupling member 10 in close relationship while permitting the insertion end 12 of the male coupling member 10 to be in face-to-face contact with abutment end of the sleeve 52. Thus, as may be seen in particularly in FIG. 2, when the male coupling member 10 is inserted in the insertion end 32 of the female coupling member 20, its flat insertion end 12 will engage the flat abutment end 53 of the sleeve 52 and, at the same time, the nose 27 will substantially fill the cavity 70 of the enlarged head 66 of stem valve 64. It will be noted that when in this position, both the male coupling member 10 and the female coupling member 20 remain closed with the annular seal 28 of the male coupling member 10 continuing to be sealingly engaged to the tapering wall portion 17 of the body portion 11 and with the outwardly facing wall 67 of the stem valve enlarged head 66 sealingly engaging the annular sealing ring 62 of the sleeve 52. In this position, the cylindrical wall surface 9 of the male coupling member 10 between the insertion end 12 and the tapering portion 14A of abutment 14 is sealingly engaged to the annular sealing ring 42 of the female coupling member 20. Additionally, and importantly, there is very little space and, preferably, virtually no space at all between the engaged male coupling member 10 and female coupling member 20 for the inclusion of air. The distance between right hand shoulder 65 as viewed in FIG. 1 (i.e., the shoulder toward the receiving end 32) and the bottom of the cavity 70 receiving the leading end of the nose 27 is such as to maximize opening of the male coupling member 10.

Continued movement of the male coupling member 10 into the female coupling member 20 causes the insertion end 12 of the body portion 11 to urge against the abutment end 53 of the sleeve 52 against the yielding action of the compression spring 59. Since the stem valve 64 is maintained in a position by virtue of its connection to the apertured wall 43, such axial displacement of the sleeve 52 opens the passageway between the annular sealing ring 62 and the enlarged head outwardly facing wall 67. Similarly, such continued movement of the male coupling member 10 causes the stem valve 64 to effect retraction of the axial stem valve 29 of the male coupling member 10 against the yielding action of the compression spring 30, displacing the annular seal 28 of the enlarged head 26 out of engagement with the tapering wall portion 17 and thereby opening the joined male coupling member 10 and female coupling member 20 to the flow of fluid therethrough. It should be noted that the size of the enlarged head 66 of the stem valve 64 adjacent the end 68 is smaller than the opening of the 64 male coupling member 10 through which the enlarged head 66 protrudes so that there is no interference with its movement into the male coupling member body portion 10 to retract the stem valve 29.

As is well known in the art, there is provided an annular collar 72 which is retracted against the forward urging action of compression spring 73 thereby permitting the detent balls 36 to move radially outwardly in order to permit insertion of the male coupling member 10 without interference therefrom. This is the position shown in FIG. 2. Following complete insertion of the male coupling member 10 to the position shown in FIG. 3, the collar 72 is permitted to move forwardly toward the insertion end in response to urging by the compression spring 73 to urge the detent balls 36 into the groove 15 thereby retaining the male coupling member 10 engaged to the female coupling member 20.

As will be readily appreciated from viewing FIGS. 2 and 3, in releasing the male coupling member 10 from the female coupling member 20, both the stem valve 25 and the stem valve 64 will be closed to the flow of fluid prior to or simultaneously with disengagement of the seal 42 from the male coupling member cylindrical wall surface 9 adjacent the insertion end 12. This coupled with the fact that there is little or no space between the nose portion 27 and the enlarged head 67 and no space between the engaged flat insertion end 12 and flat abutment end 53, permits such disengagement with little or no spillage or escape of fluid.

Referring now to the embodiment of FIGS. 4–6, there is shown a female coupling member 120 having a body portion 131 which is virtually identical to the body portion 31 of the female coupling member 20 described in the embodiment of FIGS. 1 through 3. The only significant different between the body portion 131 of the embodiment of FIGS. 4 through 6 and the body of 31 of the embodiment of FIGS. 1 through 3 is that the body 131 of the embodiment of FIGS. 4 through 6 does not have an integrally formed apertured web such as the apertured web 43 of the embodiment of FIGS. 1 through 3. The body portion 131 is provided with a separately formed web member or spider 143 which is positioned in a constricted area 151 of the body 131. An inwardly facing groove 163 between the constricted area 151 and the threaded section 150 receives a snap ring 101 positioned to engage and restrict movement of the spider 143 toward the opposing end 133. The body portion 131 is also provided with a radially inwardly extending shoulder 176 which is positioned to be engaged by and restrict axial movement of the spider 143 toward the receiving end 132.

The spider 143 has a centrally positioned aperture 144 defined by a hub 146 lying on this axis A and a plurality of three flow passageways 145 separated by wings 147 positioned around the hub 146 (See FIG. 4A).

An axially extending stem valve 164 is mounted in the centrally positioned aperture 144 of the spider 143 and has enlarged shoulders 165 on opposite sides of the spider 143 holding it in position on the spider 143 and in position in the body 131.

When the male coupling member 10 is inserted in the receiving end 132 of the female coupling member 120, the enlarged head 166 receives the nose 27 of the male coupling member 10 in the cavity 170 and the flat insertion end 12 engages the flat abutment end 153 of the sleeve 152 after the sealing ring 142 has become sealingly engaged to the cylindrical wall surface 9 adjacent such insertion end 12. As shown in FIG. 5, there is virtually no space for air to be entrapped as the male coupling member 10 and female coupling member 120 are moved to the partially connected position of FIG. 5 and thereafter to the fully engaged position of FIG. 6. As the male coupling member 10 completes its movement to the fully engaged position of FIG. 6, the sleeve 152 will be axially displaced out of engagement with the outwardly facing wall 167 of the stem valve 164 and the axial stem valve 25 of the male coupling member 10 will be caused by the stem valve 164 to retract against the yielding action of spring 30 to displace the annular seal 28 of stem valve 25 out of engagement with the tapering wall 17 thereby opening the joined male coupling member 10 and female coupling member 120 to the flow of fluid therethrough.

Referring now to FIG. 6A, there is shown a further embodiment of the body 131' of the female coupling member 120. In this embodiment, that section of the second inwardly facing cylindrical wall portion 138' between the sealing ring 142' and the outwardly tapering wall portion 146' has a greater axial extent than the corresponding section of the second inwardly facing cylindrical wall portion 138 of the embodiment of FIGS. 6–8. As a result of such greater axial extent, the annular seal 157' of the sleeve 152' will remain in sealing engagement with the second inwardly facing cylindrical wall portion 138' when the male coupling member 10 is fully engaged to the female coupling member 120' as well as when it is disengaged therefrom.

Referring now to the embodiment of FIGS. 7 through 9, there is shown a female coupling member 220 having a body portion 231 with an integrally formed web 243. The web 243 has a central aperture 244 and a plurality of five flow passages 245. An insert 202 having inwardly facing threads is positioned in the central aperture 224 and retained therein by any desired fastening means.

The body 231 extends from a receiving end 232 to an opposing end 233 and has an axial passageway 234 extending from the receiving end 232 to the opposing end 233. Except as described herein, the body 231 is substantially the same as the body 31 of the embodiment of FIGS. 1 through 3. In this embodiment, the second inwardly facing cylindrical wall portion 238 extends from the tapering wall portion 239 toward the opposing end 233 and terminates at an inwardly directed shoulder 203 which joins the second inwardly facing cylindrical wall portion 238 with a third inwardly facing cylindrical wall portion 204 having a smaller diameter than that of the second inwardly facing cylindrical wall portion 238. The third inwardly facing cylindrical wall portion 204 extends to another radially inwardly directed shoulder 205 which extends inwardly to join with a fourth inwardly facing cylindrical wall portion 206 having yet a smaller diameter than that of the third inwardly facing cylindrical wall portion 204. The fourth inwardly facing cylindrical wall portion 206 extends to the web 243. An inwardly facing groove 240 spaced a short distance from the tapering wall portion 239 has positioned therein a plastic ring 241 and an annular sealing ring 242.

An axially moveable sleeve 252 is positioned in the passageway 234. The sleeve 252 has a substantially flat abutment end 253 sized to receive the insertion end 12 of the male coupling member 10 in surface-to-surface contact and an opposing end 254.

The sleeve 252 at the abutment end 253 has a size to be slideably received in the second inwardly facing cylindrical wall portion 238. In an area adjacent the abutment end 253, the sleeve 252 has an outwardly facing annular groove in which is positioned (1) an annular seal 209 sealingly engaged with the inwardly facing cylindrical wall portion 238 and (2) a Teflon or similar rigid plastic ring 296. A radially inwardly directed ledge 207 connects the portion of the sleeve engaging the second inwardly facing cylindrical wall portion 238 with a reduced diameter cylindrical portion 208 which is sized to be slideably received in the fourth inwardly facing cylindrical wall portion 206 of the body 231. The fourth inwardly facing cylindrical wall portion 206 has an inwardly facing annular groove in which is positioned an annular sealing gasket 210 which is sealingly engaged with the sleeve reduced cylindrical wall portion 208. A Teflon or similar rigid plastic ring 211 is also positioned in the groove.

The sleeve 252 also has an inwardly facing groove spaced a short distance from the abutment end 253. An annular sealing ring 262 is positioned in such groove. A shoulder 269 extends inwardly from that side of the groove on the opposite side of the annular sealing ring 262 from the abutment end 253.

A compression spring 259 is positioned between the shoulder 205 of the body 231 and the shoulder 207 of the sleeve 252 and yieldingly urges the sleeve 252 toward the receiving end 232 of the body 231.

A stem valve 264 is threadedly engaged to the threads of the threaded insert 202. The opposing end of the stem valve 264 has an enlarged head 266 with an outwardly flaring wall having an outwardly facing surface 267 adjacent its end 268 which is sized to sealingly engage the annular sealing ring 262 of the sleeve 252. The size of the enlarged head 266 in the area adjacent the end 268 is greater than the size of the opening of the sleeve 252 at the shoulder 269 adjacent the annular sealing ring 262 and, therefore, provides a means for limiting axial movement of the sleeve 252 toward the receiving end 232 in response to urging of the spring 259.

The enlarged head 266 has a cavity 270 at its end 268. As can be seen in FIGS. 8 and 9, when the male coupling member 10 is inserted into the female coupling member 220, the nose 27 substantially fills the cavity 270 of the enlarged head 266. That coupled with (1) the fact that the flat surface of the end 12 of the male member 10 engages the flat surface of the end 253 of the sleeve 252 and (2) the fact that the cylindrical wall surface 9 of the male coupling member 10 adjacent the leading end 12 sealingly engages the annular sealing ring 242 prior to or simultaneously with opening either the stem valve 25 of the male coupling member 10 or the stem valve 264 of the female coupling member 220 reduces to a minimum the possibility for the inclusion of air during joining and subsequent movement of the male coupling member 10 to the fully engaged open position shown in FIG. 9 or the possibility of leakage when the male coupling member 10 is disconnected.

The body 231 is provided with a vent passageway 215 in order to prevent a build-up of pressure as the sleeve 252 is moved toward the opposing end 233 by movement the male coupling member 10 toward the fully engaged position and the resulting reduction in the size of the cavity in which the spring 259 is positioned.

Figure 10:
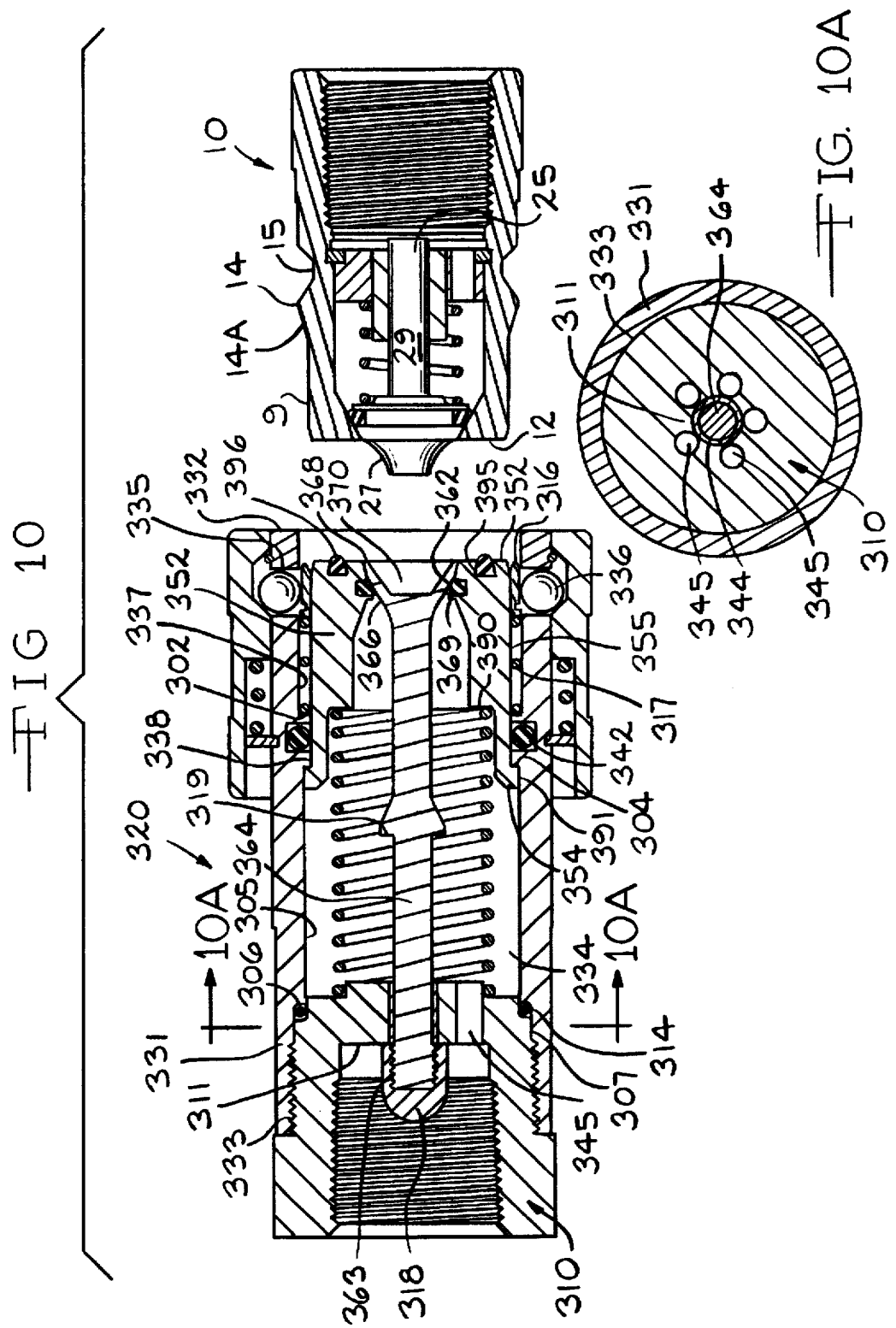
FIG. 10 is an elevational view in section showing yet another embodiment of female coupling member disconnected from a male coupling member.

Referring now to the embodiment of FIGS. 10 through 12, the female coupling member 320 includes a body 331 extending from a receiving end 332 to an inwardly threaded attachment end 333. The body has an axial passageway 334 extending therethrough. The body 331 includes a first inwardly facing cylindrical wall portion 337, an inwardly directed shoulder 302 joining a second inwardly facing cylindrical wall portion 338 of smaller diameter than the first inwardly facing cylindrical wall portion 337. An inwardly facing annular groove is formed in the second cylindrical wall portion 338 in which is positioned an annular sealing ring 303. An outwardly extending shoulder 304 joins the second inwardly facing cylindrical wall portion 338 with a third inwardly facing cylindrical wall portion 305. The third inwardly facing wall portion 305 extends to an outwardly directed shoulder 306 which joins with a fourth inwardly facing cylindrical wall portion 307 which extends to the threaded portion adjacent the connection end 333.

A plug 310 is threadedly engaged to the connection end 333 of the body 331. The plug includes a lateral wall 311 functioning as a web. The lateral wall 311 has a centrally positioned aperture 344 lying on the axis A and a plurality of five flow passages 345 positioned around the central aperture 344. A bushing 313 is firmly engaged in the centrally positioned aperture 344. An annular seal 314 is positioned between the plug 310 and the shoulder 306 of the body 331.

An axially moveable sleeve 352 is positioned in the passageway 334. The sleeve 352 has an abutment end 353 for engagement by the insertion end 12 of the male coupling member 10 and an opposing end 354. The abutment end 353 provided with an annular recess 395 in which is positioned an annular seal 396. The recess preferably has a depth slightly greater than one-half the thickness of the annular seal 396 (i.e. ½ the diameter of its cross section) so that it may be frictionally retained in the recess 395 and will extend outwardly from the abutment end 353. The sleeve 352 has an outwardly facing cylindrical wall portion 355 sized to be in spaced relationship with the first inwardly facing cylindrical wall portion 337 and in slideably engagement with the second inwardly facing cylindrical wall portion 338. Extending outwardly from the outwardly facing cylindrical wall portion 355 is a flange 391 slideably engaged to the third inwardly facing cylindrical wall portion 305. The flange extends from the opposing end 354 to a shoulder which abuts the shoulder 304 of the body 331 when the sleeve 352 is at its forwardmost position closest to the receiving end 332 as shown in FIG. 10.

The sleeve 352 has an inwardly facing groove in which is positioned an annular sealing ring 362. Adjacent the inwardly facing groove receiving the annular sealing ring 362 is a shoulder 369 defining a reduced size opening. The sleeve 352 has an internal shoulder 390 spaced from the opposing end 354. A compression spring 359 is positioned between the wall 311 and the shoulder 390 to yieldingly urge the sleeve 352 toward the receiving end 332.

Positioned in the space between the first inwardly facing cylindrical wall portion 337 and the outwardly facing cylindrical wall portion 355 of the sleeve 352 is a retainer ring 316 and a compression spring 317. The retainer ring 316 is yieldingly urged by the compression spring 317 toward a full forward position aligned with the detent balls 336 and functions to hold the detent balls 336 from inward movement when the male coupling member 10 is disconnected from the female coupling member 320. Upon movement of the male coupling member 10 into the female coupling member 320, the tapered portion 14A of the abutment 14 engages the retainer ring 316 pushing it axially away from the receiving end 332 to release the detent balls 336 for engagement in the groove 15 of the male coupling member 10. Utilization of the retainer ring 316 permits the apertures 335 to have an uniform size throughout the thickness of the wall of the body 331.

Slideably positioned in the bushing 313 is an axially extending stem valve 364 which extends from a threaded engagement end 363 to an enlarged head 366. The stem valve extends through the central aperture 344 with the threaded engagement end being positioned on the opposite side of the lateral wall 311 from the enlarged head 366. An end cap 318 is engaged to the threaded end 363. The end cap 318 is larger than the aperture 344 and engages wall 311 when the stem valve 364 is in its forward most position (FIG. 10) to thereby limit the extent to which the stem valve 364 can be moved axially toward the receiving end 332 of the body 331. The stem valve 364 is provided with an enlarged abutment 319 approximately midway between its ends. The enlarged abutment 319 is sized to engage the wall 311 to thereby limit the extent to which the stem valve 364 may move in the retracted direction away from the receiving end 332.

The stem valve 364 extends through the sleeve 352. The enlarged head 366 has a cavity 370 at its leading end 368 which is sized to snugly receive the nose 27 of stem valve 25 of the male coupling member 10 and an outwardly facing wall 367 which is sealingly engaged to the annular seal 362 when in the closed position. Limitation on forward movement of the sleeve 352 toward the engagement end 332 results from engagement of the outwardly extending flange at the end 354 of the sleeve engaging the shoulder 304 of the body 331.

As will be appreciated and as can be seen from FIG. 11, initial movement of the male member 10 into the female member 320 urges both the slideable sleeve 352 and the axially moveable stem valve 364 away from the receiving end 332 with the result that both the female member 320 and the male coupling member 10 remain in a closed position. The outwardly facing wall 367 of the stem valve 364 compresses the annular seal 362 and engages shoulder 369 of the sleeve 352 with the result that movement of the sleeve 352 away from the receiving end 332 would carry with it the stem valve 364 in any event. However, the primary force moving the stem valve 362 is from the nose 27 of the male coupling member 10. It is not until the stem valve 364 is stopped from further retracted axial movement by engagement of the enlarged abutment 319 against the lateral 311 that the continued movement of the sleeve 352 away from the receiving end 332 results in opening the stem valve 364. The continued movement of the male member 10 into the female member 320 against the action of the now fixed stem valve 364 which has bottomed against the web 343 causes the stem valve 25 of the male member 10 to be retracted away from its insertion end 12 and moved to an open position.

As can be seen from FIGS. 11 and 12, as the male coupling member 10 is inserted into the female coupling member 320, the nose 27 will substantially fill the cavity 370 and the flat insertion end 12 will engage and compress the annular seal 396 to effect sealing engagement therewith. Preferably the distance the annular seal 396 extends outwardly from the flat portion of the abutment end 353 a sufficiently small amount that, upon being compressed by the insertion end 12, such insertion end will contact the abutment end 353 thereby reducing to a minimum the amount of air inclusion. Additionally substantially simultaneously with or prior to the opening of the respective stem valves 25 of the male coupling member 10 and 364 of the female coupling member 320, the cylindrical wall surface 9 of the male coupling member 10 adjacent the insertion end 12 will sealingly engage the annular sealing ring 342.

Referring now to FIGS. 13 through 15, there is shown yet another embodiment in which the female coupling member 420 is provided with a body 431 extending from a receiving end 432 to a threaded connection end 433. The body 431 has a first inwardly face wall portion 437, an outwardly extending shoulder 439 joining the first inwardly facing cylindrical wall portion 437 with a second and larger inwardly facing wall portion 438. A second outwardly extending shoulder 404 joins the second inwardly facing cylindrical wall section 438 with a third and still larger inwardly facing cylindrical wall section 405. The third inwardly facing cylindrically wall section 405 extends to the threads at the threaded connection end 433.

As in the embodiment of FIGS. 10 through 12 a plug cap 410 is threadedly engaged to the threaded end 433 of the body 431. The plug 410 is provided with a lateral wall 411 which functions as a web. The lateral wall 411 has a central aperture 444 and a plurality of five flow passages 445.

An axially extending stem valve 464 is slideably positioned in the central aperture 444 and is provided with a threaded end portion 463 which extends through the central aperture 444 on the opposite side of the end wall 443 from the receiving end 432. A threaded cap 418 is engaged to such threaded end 463. The cap is sized larger than the central aperture 444 and functions to engage the lateral wall 411 and thereby limit the extent to which the stem valve 464 may be moved axially toward the receiving end 432.

The stem valve 464 has an enlarged head 466 and an enlarged abutment 419 having a size larger than the central aperture 444. The enlarged abutment 419 functions to limit the extent to which the stem valve 464 may be retracted away from the engagement end 432.

An axially moveable sleeve 452 is positioned in the receiving end of the body 431. The sleeve 452 extends from an abutment end 453 for engagement by the insertion end 12 of the male coupling member 10 and an opposing end 454. The sleeve 452 has a first outwardly facing cylindrical wall portion 480 which extends from the abutment end 453 and is in spaced relationship with the first inwardly facing wall portion 437 of the body 431. An outwardly extending shoulder 481 joins the first outwardly facing cylindrical wall portion 480 with a second and larger outwardly facing wall portion 482 which is in spaced relationship with the second inwardly facing wall portion 438 of the body 431. An outwardly flaring flange 483 extends from the second outwardly facing wall portion 482 and is sized to be in sliding contact with the third inwardly facing cylindrical wall portion 405 of the body 431.

Internally the sleeve 452 is provided with an inwardly facing shoulder 484, an annular groove in which is positioned an annular seal 462 and an inwardly extending retainer flange 469. The stem valve 464 has an enlarged head 466 with an outer surface 467 which sealingly engages the annular seal 462 and has a cavity 470 of the end 468 to receive the nose 27 of the male coupling member 10.

A compression spring 459 is positioned between the lateral wall 411 of the plug 410 and the shoulder 484 of the sleeve 452 to yieldingly urge the sleeve 452 toward the receiving end 432. As a result of the enlarged head 466 and its outer surface 467 engaging the annular seal 462 and the shoulder 469, such forward movement of the sleeve 452 carries with it the stem valve 464 to its forward position. The outwardly facing flange 483 of the sleeve 452 engages the shoulder 404 and serves to limit the extent of which the sleeve 452 may be urged toward the receiving end 432.

A ball retention member 41 6 is positioned in the space between the sleeve first ball sleeve 480 and the body first inwardly facing cylindrical wall section 437. A compression spring 417 is positioned in the space between the second outwardly facing wall 482 of the sleeve 452 and the second inwardly facing wall 438 of the body 431. The compression spring 417 has one end engaged against the flange and the other end engaged against the ball retention ring 416. The ball retention ring 416 is provided with outwardly extending flanges 493 and 494 and an axially extending web 495 defining an outwardly facing groove in which is positioned a first annular seal 490 an inwardly facing groove in which is positioned a second annular seal 491. Thus, the respective annular seals function to prevent the escape of fluid from the passageway. The spring 417 urges the retention ring 416 to a forward position normally overlying the detent balls 436 to hold them from falling of their respective apertures 435 when the male member 10 is disengaged therefrom. Upon movement of the male member 10 into the female member 420, the ramp 14A of the abutment 14 engages and carries with it the retention ring 416 away from the receiving end 432 against the yielding urging of compression spring 417.

As in the case of the embodiment of FIGS. 10 through 12, movement of the male coupling member 10 into the female coupling member 420 causes the stem valve 464 to retract but not open during its initial movement as the sleeve 452 is carried with the stem valve 464 away from the engagement end 432 by (1) urging from the insertion end 12 of the male coupling member 10 and (2) interference between the enlarged head 466 of the stem valve 464 and the flange 469. It is not until the enlarged abutment 419 of the stem valve 464 engages the wall 411 of plug 410 and is prevented from further axial movement away from the engagement end 432 while the sleeve 452 continues its axial movement, that the valve opens.

Other modifications will be readily apparent to those skilled in the art. Accordingly, the scope of the present application should be determined only by the scope of the allowed claims.

We claim:

1. For use with a male coupling member having (1) a body portion with an entrance end including an annular surface defining an opening communicating with an axial passageway and (2) an axially extending stem valve axially movable in said axial passageway between a closed position and an open position, said stem valve including a nose with extends through said opening and outwardly from said annular surface when said stem valve is in said closed position, a female coupling member comprising:

(a) a body having a passageway extending along an axis from a receiving end to an opposing end, said receiving end (1) sized to receive said male coupling member body portion and (2) defining an opening to said passageway;

(b) a sleeve having an engagement end and an opposing end positioned in said passageway for axial movement therein from a forward position in the vicinity of said receiving end to a retracted position closer to said opposing end;

(c) a stem valve mounted on said body and extending through said sleeve and having an enlarged head sealingly engageable with said sleeve, said sleeve and said stem valve being relatively moveable between an engaged, closed position and an open position, said enlarged head having a cavity sized to receive said nose when said male coupling member entrance end engages said sleeve engagement end; and (d) a spring yieldingly urging said sleeve toward said forward position, movement of said male coupling member into said female coupling member engaging said annular surface against said sleeve engagement end and said nose in said cavity and thereafter axially displacing said sleeve out of engagement with said stem valve, said female coupling member being configured such that engagement of said annular surface against said engagement end prior to axially displacing said sleeve to said open position causes those portions of the joined male coupling member and female coupling member in the area of said annular surface and said engagement end to be occupied substantially entirely by portions of said male coupling member body and stem valve and by portions of said female coupling member body, sleeve and stem valve with substantially no spaced apart areas for the accumulation of fluid.

2. A female coupling member according to claim 1, further including an annular seal extending radially inwardly into said passageway in the vicinity of said receiving end sized to sealingly receive said male coupling member body portion.

3. A female coupling member according to claim 2, wherein said annular seal is positioned to sealingly engage said male coupling member body portion simultaneously with or prior to said annular surface engaging said sleeve engagement end.

4. A female coupling member according to claim 1, wherein said stem valve is fixedly mounted in said body.

5. A female coupling member according to claim 1, wherein said stem valve is mounted for axial movement in said body of an extent which is less than the extent of axial movement of said sleeve.

6. A female coupling member according to claim 1, wherein said body includes a wall extending laterally of said axis between said sleeve and said opposing end and said stem valve is fixedly secured to said wall.

7. A female coupling member according to claim 1, wherein said body includes a wall extending laterally of said axis between said sleeve and said opposing end, said wall including an aperture, said stem valve slidingly received in said aperture for axial movement between a forward position and a retracted position closer to said opposing end and further including means yieldingly urging said stem valve toward said forward position.

8. A female coupling member according to claim 1, further including a sealing gasket providing a seal between said sleeve and said body and further including a vent in said body axially positioned between said sealing gasket and said sleeve opposing end.

9. A female coupling member according to claim 1, wherein said male coupling member includes an outwardly facing cylindrical wall portion extending away from said entrance end and a tapering wall portion extending outwardly at an acute angle to said axis to an abutment and said female coupling member body includes a first inwardly facing cylindrical wall section extending axially inwardly from said receiving end and sized to permit movement of said abutment therethrough, a second inwardly facing cylindrical wall section having a size to receive said male coupling member cylindrical wall portion in close relationship and an inwardly tapering wall portion joining said first and second inwardly facing cylindrical wall sections, said inwardly tapering wall portion positioned and disposed at an angle to receive said male coupling member tapering wall portion in substantially face-to-face relationship when said nose is received in the cavity of said stem valve enlarged head.

10. A female coupling member according to claim 9, further including an annular sealing ring extending inwardly from said second inwardly facing cylindrical wall section positioned axially to sealingly engage said male coupling member outwardly facing cylindrical wall portion prior to or simultaneously with the opening of said stem valve.

11. A female coupling member according to claim 9, wherein said body is provided with a reduced diameter cylindrical wall section between said second inwardly facing wall section and said opposing end and said sleeve is provided with (1) a sealing gasket in the vicinity of said engagement end engageable with said second inwardly facing cylindrical wall and (2) an outwardly facing cylindrical wall surface slideably received in said body reduced diameter cylindrical wall section, said body having a vent located in an axial position between said sealing gasket and said reduced diameter cylindrical wall section.

12. A female coupling member according to claim 9, wherein said female coupling member body further includes a tapered section extending from said second inwardly facing cylindrical wall section outwardly in an axial direction toward said opposing end and said sleeve is provided with an annular ring engageable with said tapered section for limiting axial movement of said sleeve toward said receiving end.

13. A female coupling member according to claim 12, wherein said female coupling member body further includes an inwardly tapering wall portion extending in an axial direction toward said opposing end positioned between said tapered section and said opposing end and said sleeve is provided with an abutting surface engageable with said body inwardly tapering wall portion.

14. A female coupling member according to claim 1, wherein said sleeve is a one-piece member.

15. A female coupling member according to claim 1, wherein said body includes a primary unit extending from said receiving end and a closure unit at said opposing end affixed to said primary unit, said closure unit including a wall extending laterally of said axis.

16. A female coupling member according to claim 15, wherein said wall has an aperture and a predetermined thickness in the axial direction and said stem valve (i) extends through said aperture and (ii) has spaced apart shoulders extending outwardly beyond said aperture on opposite sides of said wall, said shoulders being spaced apart a distance greater than said predetermined thickness to permit axial movement of said stem.

17. A female coupling member according to claim 15, wherein said wall includes a central aperture and said stem valve is slidingly received in said aperture.

18. A female coupling member for use with a male coupling member having a body portion with a substantially flat annular entrance end, a cylindrical wall portion extending from said entrance end and an axially moveable valve with a nose extending outwardly from said entrance end, said female coupling member comprising (a) a body portion having a receiving end for receiving said male member, (b) an axially slideable sleeve positioned in said body portion for movement toward and away from said receiving end, said sleeve having a substantially flat abutment end sized to be engaged by said entrance end, (c) means yieldingly urging said sleeve toward said receiving end, (d) an annular seal in said body portion positioned and sized to sealingly engage said male member cylindrical wall portion, (e) a stem valve positioned in said body portion, said stem valve sealingly engageable with said sleeve and having a free end (1) facing toward said body receiving end and (2) having a cavity contoured to receive said male coupling member nose, engagement of said male member to said female member urging said axially slideable sleeve away from said receiving end and out of sealing engagement with said stem valve, and creating a substantially planar annulus defined by said male coupling member annular entrance end and said sleeve abutment end encircling said joined male coupling member nose and said stem valve free end such that, prior to urging said sleeve out of engagement with said stem valve, the portions of the engaged male coupling member and female coupling member encircled by and adjacent said planar annulus having substantially no spaced apart areas for presence of fluid.

19. A female coupling member according to claim 18, wherein said stem valve is mounted in an axially fixed position.

20. A female coupling member according to claim 18, wherein said stem valve is mounted for limited axial movement.

21. A female coupling according to claim 18, wherein said sleeve has an inwardly facing annular seal spaced from said abutment end and said stem valve has an enlarged head at said free end, said enlarged head being engageable to both said annular seal and said sleeve adjacent to said annular seal.

22. For use with a male coupling member having (1) a body portion with an entrance end including an annular surface defining an opening communicating with an axial passageway, an outwardly facing cylindrical wall portion adjacent said entrance end and an outwardly extending abutment spaced from said entrance end and (2) an axially extending stem valve axially movable in said axial passageway between a closed position and an open position, said stem valve including a nose which extends through said opening and outwardly from said annular surface when said stem valve is in said closed position, a female coupling member comprising:

(a) a body having a passageway extending along an axis from a receiving end to an opposing end, said receiving end (1) sized to receive said male coupling member body portion and (2) defining an opening to said passageway, a first inwardly facing cylindrical wall section extending axially inwardly from said receiving end and sized to permit movement of said abutment therethrough, a second inwardly facing cylindrical wall section having a size to receive said male coupling member cylindrical wall portion in close relationship and a tapered section extending from said second inwardly facing cylindrical wall section outwardly in an axial direction toward said opposing end;

(b) a sleeve having an engagement end and an opposing end positioned in said passageway for axial movement therein from a forward position in the vicinity of said receiving end to a retracted position closer to said opposing end, said sleeve having an annular ring engageable with said tapered section for limiting axial movement of said sleeve toward said receiving end;

(c) a stem valve mounted on said body and extending through said sleeve and having an enlarged head sealingly engageable with said sleeve, said sleeve and said stem valve being relatively moveable between an engaged, closed position and an open position, said enlarged head having a cavity sized to receive said nose when said male coupling member entrance end engages said sleeve engagement end; and (d) a spring yieldingly urging said sleeve toward said forward position, movement of said male coupling member into said female coupling member engaging said annular surface against said sleeve engagement end and said nose in said cavity and thereafter axially displacing said sleeve out of engagement with said stem valve.

23. A female coupling member according to claim 22, wherein said female coupling member body further includes an inwardly tapering wall portion extending in an axial direction toward said opposing end positioned between said tapered section and said opposing end and said sleeve is provided with an abutting surface engageable with said body inwardly tapering wall portion.

24. A female coupling member according to claim 22 wherein said female coupling member is configured such that engagement of said annular surface against said engagement end prior to relative movement of said sleeve and said stem valve to said open position causes those portions of the joined male coupling member and female coupling member in the area of said annular surface and said engagement end to be occupied substantially entirely by portions of said male coupling member body and axially extending stem valve and by portions of said female coupling member body, sleeve and stem valve with substantially no spaced apart areas for the accumulation of fluid.

25. A female coupling member according to claims 1, 2, 4, 5, 6, 7, 8, 9, 10, 11, 14, 18, 22 or 23, wherein said sleeve engagement end is provided with an annular seal extending axially outwardly therefrom.

26. For use with a male coupling member having (1) a body portion with an entrance end including an annular surface defining an opening communicating with an axial passageway and (2) an axially extending stem valve axially movable in said axial passageway between a closed position and an open position, said stem valve including a nose which extends through said opening and outwardly from said annular surface when said stem valve is in said closed position, a female coupling member comprising:
(a) a body having a passageway extending along an axis from a receiving end to an opposing end, said receiving end (1) sized to receive said male coupling member body portion and (2) defining an opening to said passageway, an inwardly facing cylindrical wall portion spaced from said receiving end and terminating at an outwardly tapering wall portion, said outwardly tapering wall portion defining a part of an inwardly facing annular groove,
(b) a sleeve having an engagement end and an opposing end positioned in said passageway for axial movement along said inwardly facing cylindrical wall portion from a forward position in the vicinity of said receiving end to a retracted position closer to said opposing end, said sleeve having an outwardly facing annular groove and a ring positioned in said outwardly facing annular groove for movement with said sleeve, said ring extending radially outwardly into said body inwardly facing annular groove and engageable with said outwardly tapering wall portion to limit movement of said sleeve toward said forward position;
(c) a stem valve mounted on said body and extending through said sleeve and having an enlarged head sealingly engageable with said sleeve, said sleeve and said stem valve being relatively moveable between an engaged, closed position and an open position, said enlarged head having a cavity sized to receive said nose when said male coupling member entrance end engages said sleeve engagement end; and
(d) a spring yieldingly urging said sleeve toward said forward position,
movement of said male coupling member into said female coupling member engaging said annular surface against said sleeve engagement end and said nose in said cavity and thereafter axially displacing said sleeve out of engagement with said stem valve.

27. A female coupling member according to claim 26 wherein said female coupling member is configured such that engagement of said annular surface against said engagement end prior to axially displacing said sleeve to said open position causes those portions of the joined male coupling member and female coupling member in the area of said annular surface and said engagement end to be occupied substantially entirely by portions of said male coupling member body and stem valve and by portions of said female coupling member body, sleeve and stem valve with substantially no spaced apart areas for the accumulation fluid.

28. A female coupling member according to claim 26, wherein said stem valve is mounted for axial movement in said body of an extent which is less than the extent of axial movement of said sleeve.

29. The female coupling member according to claim 26, further including an outwardly facing groove on said sleeve and an annular seal positioned in said groove and engaging said body second inwardly facing cylindrical wall section.

30. The female coupling member according to claim 29, wherein said annular seal is engaged to said body inwardly facing cylindrical wall throughout axial movement of said sleeve from said forward position to said retracted position.

31. A female coupling according to claim 26, wherein said sleeve has an inwardly facing annular seal spaced from said engagement end and said stem valve enlarged head is engageable to both said annular seal and said sleeve adjacent to said annular seal.

32. For use with a male coupling member having (1) a body portion with an entrance end including an annular surface defining an opening communicating with an axial passageway and (2) an axially extending stem valve axially moveable in said axial passageway between a closed position and an open position, said stem valve including a nose which extends through said opening and outwardly from said annular surface when said valve is in said closed position, a female coupling member comprising:
(a) a body having a passageway extending along an axis from a receiving end to an opposing end, said receiving end (1) sized to receive said male coupling member body portion and (2) defining an opening to said passageway;
(b) a sleeve having an engagement end and an opposing end positioned in said passageway for axial movement therein from a forward position in the vicinity of said receiving end to a retracted position closer to said opposing end, said engagement end having an annular seal extending axially outwardly for sealing engagement with said male coupling member entrance end;
(c) a stem valve mounted on said body and extending through said sleeve and having an enlarged head sealingly engageable with said sleeve, said sleeve and said stem valve being relatively moveable between an engaged, closed position and an open position, said enlarged head having a cavity sized to receive said nose when said male coupling member entrance end engages said sleeve engagement end; and
(d) creating a substantially planar annulus defined by said male coupling entrance end and said sleeve annular seal encircling said joined male coupling member nose and said stem valve free end such that, prior to urging said sleeve out of engagement with said stem valve, the portions of the engaged male coupling member and female coupling member encircled by and adjacent said planar annulus having substantially no spaced apart areas for presence of fluid.

* * * * *